United States Patent [19]

Haferkamp et al.

[11] 4,025,387
[45] May 24, 1977

[54] NUCLEAR POWER PLANT WITH CLOSED GAS-COOLING CIRCUIT COMPRISING MULTIPLE IDENTICAL THERMODYNAMIC CIRCUITS

[75] Inventors: Dirk Haferkamp; Alija Hodzic, both of Mannheim; Ulrich Winter, Eppelheim, all of Germany

[73] Assignee: Hochtemperatur-Reactorbau GmbH, Mannheim, Germany

[22] Filed: Nov. 17, 1975

[21] Appl. No.: 632,772

[30] Foreign Application Priority Data

Nov. 16, 1974   Germany ........................... 2454451

[52] U.S. Cl. .................................... 176/60; 176/65; 176/87
[51] Int. Cl.[2] ........................................ G21C 19/28
[58] Field of Search ............................... 176/58–60, 176/65, 87

[56] References Cited

UNITED STATES PATENTS 3,748,228   7/1973   Zimmermann ....................... 176/65

FOREIGN PATENTS OR APPLICATIONS

654,276   12/1962   Canada .................................. 176/60
1,022,003   3/1966   United Kingdom .................. 176/60
1,294,672   11/1972   United Kingdom .................. 176/60
1,144,172   3/1969   United Kingdom .................. 176/60

Primary Examiner—Stephen C. Bentley
Assistant Examiner—S. A. Cangialosi
Attorney, Agent, or Firm—Bacon & Thomas

[57] ABSTRACT

Disclosed is a nuclear power plant comprising a closed gas-cooling circuit and a plurality of identical, parallel-connected thermodynamic circuits (loops) symmetrically installed. Each of these loops constitutes a turbine assembly comprising a turbine and a compressor as well as devices for the internal and external heat exchange and is coupled with a nuclear reactor. The reactor is installed in the center of a cavern located in a vessel made of reinforced concrete, while the components comprising the circuit and the conduits connecting the various components are installed in cavities inside the reinforced concrete vessel. The turbine assemblies are located in horizontal shafts in the lower region of the vessel, and vertical shafts are provided for the gas transport pipes, which are arranged coaxially therein. These shafts and also pods for the heat exchange equipment are arranged symmetrically about the vessel axis.

23 Claims, 10 Drawing Figures

NUCLEAR POWER PLANT WITH CLOSED GAS-COOLING CIRCUIT COMPRISING MULTIPLE IDENTICAL THERMODYNAMIC CIRCUITS

BACKGROUND OF THE INVENTION

The present invention relates to a nuclear power plant and more especially to a nuclear power plant having a closed gas-cooling circuit and a plurality of heat-utilizing circuits or loops.

The design according to the invention offers the advantage that only the resulting mechanical or electrical yield is actually removed from the concrete pressure tank, aside from the cooling water which does not come into contact with the contaminated gas. As a result, the external space surrounding the concrete pressure vessel is effectively protected against contaminated gases, while the internal space of the vessel is utilized optimally. The decisive advantage of the design under the invention is the fact that the high-temperature medium is not carried to merely one gas-turbine assembly of relatively large dimensions (as in the case with most conventional nuclear reactors equipped with a closed gas-cooling circuit,) but that a plurality of relatively small gas-turbine assemblies are installed inside the concrete vessel. The several smaller turbine assemblies are linked to the nuclear reactor, each constituting a separate thermodynamic circuit (loop) each with its own heat exchanger. Through an integrated design, i.e., by installing all components, such as the nuclear reactor, the gas turbine assemblies and the connecting tubing inside one common pressure vessel, the need for any special connectors between active gas containing components is eliminated. This fact is of decisive advantage in the construction and operation of high-temperature reactors.

German Offenlegungsschrift No. 1,764,249 discloses a nuclear power plant of the general type defined, in which the nuclear reactor and the heat exchanging components are installed in tightly spaced, parallel and vertical shafts surrounded by a pressure-tight vessel made of reinforced concrete, with all components accessible from the outside. A primary turbine stage driving an electric generator is installed in a horizontal shaft, while the compressor, together with a secondary turbine stage which drives it, are installed in one vertical shaft, one positioned vertically directly above the other. The recuperator, because of its magnitude, has been divided into two separate sections connected in series, and both sections are installed in one vertical pod. Passageways are provided in the wall of the concrete pressure vessel and in the concrete material between the pods to allow for the circulation of cooling media, such as $CO_2$. In one preferred prototype, the nuclear power plant comprises three parallel thermodynamic circuits (loops), each loop comprising two turbine stages, one generator, one compressor, and various heat-exchanging components, with the loops being grouped symmetrically around the reactor core. Each of the three recuperators is likewise subdivided into two distinct sections. The cooling media thereby must traverse very great distances, necessitating a pressure vessel of relatively large dimensions.

The German Offenlegungsschrift No. 1,764,355 likewise described a gas-cooled nuclear reactor of integrated design in which the circulatory components, installed in tandem inside a pressure-proof concrete vessel, have been coupled by tubular channels. The entire installation comprises two identical thermodynamic circuits (loops), each of which comprises, on a common shaft, a high- and a low- pressure compressor and a gas turbine, as well as several coolers and recuperators. The coolers and recuperators are installed in a circle around the reactor and are seated in honeycomb-like recesses in the vessel wall, and each cooler is installed vertically atop its respective recuperator in the same recess. The two turbines with their respective compressors are installed in a cavity underneath the reactor together with the distributive tubing system serving the recuperators and coolers. The turbines are installed parallel to one another.

Another nuclear power plant of basically similar design is described in German Auslegeschrift No. 1,806,471. In this disclosure, not only the system of heat exchangers has been placed in parallel vertical shafts inside the wall of the concrete pressure vessel, but also the turbine assemblies comprising the compressor turbine, the power turbine and other compression devices. In one embodiment of such a plant three turbines systems are connected to the reactor as a heat source. The turbines are installed symmetrically about and parallel to the reactor. Each thermodynamic circuit (loop), together with all its pertinent components, is installed in one vertical shaft surrounded by a housing.

Lastly, German Offenlegungsschrift No. 2,062,934 may be mentioned, which likewise describes a gas-cooled nuclear reactor equipped with multiple, coupled turbine assemblies which are coupled with the nuclear reactor and are installed in vertical shafts inside the wall of the pressure vessel. By means of a by-pass device, a part of the cold gas moving in the direction of the reactor core can be diverted and mixed directly with the heated cooling gas emerging from the reactor core.

SUMMARY OF THE INVENTION

The present invention has an one object to improve upon the foregoing state of the art.

A further object of the invention resides in the attainment of a pressure vessel of smallest practicable dimensions through compactness of design.

It is also an object of the invention to provide for the attainment of an increase in the efficiency of a nuclear power plant of the type generally defined in the forgoing description.

Yet another object of the invention resides in the attainment of an improvement in the safety factors connected with such a plant.

These objectives have been attained by the present invention by installing each of the three gas turbine assemblies in a horizontal shaft at the base of the concrete pressure vessel. The shafts are arranged symmetrically to the vertical center axis of the pressure vessel, and lie in the same plane. Each thermodynamic circuit (loop) is provided with an upwardly extending vertical pod which is connected to the turbine cavity for the transfer of gas. In the vertical pods several gas-carrying tubes are installed so as to run partially coaxially, and all gas-carrying pods are installed symmetrically in a circular pattern around the vertical center axis of the concrete pressure tank. The heat exchangers are installed in vertical pods which are likewise placed in a circular pattern around the reactor cavity.

In the nuclear power plant according to the present invention a number of principles have been applied which guarantee both the efficiency and safe operation of the plant. The pressure vessel of stressed concrete is designed in total symmetry, and the components located inside the vessel, such as gas ducts, heat exchangers, armatures, etc. are accessible from the outside for purposes of maintenance, repair, and removal, after dismantling of the vessel closures. Such ease of accessibility is the result of several factors: (1) the concrete ducts containing the partially coaxial gas ducts have relatively large dimensions; (2) the vertiical gas ducts have been designed as pods; and (3) additional vertical pods permit of access to specific areas in which the components of the circuits are installed. Through installation of several gas conduits inside one concrete duct, compactness of the design of the thermodynamic circuits (loops) is attained. As a result, the concrete pressure vessel can be designed with relatively small dimensions. Furthermore, the use of coaxial gas ducts has the result that in normal operation merely minor differences in pressure will exis between gas streams moving coaxially.

The arrangement of the various components is chosen so that it can be advantageously maintained at any level in output desired, i.e., the extrapolation to increased or decreased units of output is possible without any difficulty.

The nuclear power plant under the invention is preferably designed so as to comprise a minimum of three thermodynamic circuits (loops) which are connected in parallel and coupled to the reactor. The horizontal shafts which contain the gas turbine assemblies may be positioned in various locations. In the first embodiment the horizontal shafts are placed in a radial or star-shaped pattern, the midpoint of which lies on the vertical central axis of the concrete vessel. The horizontal shafts may be extended up to this axis, i.e., they converge at the midpoint of the star.

In a nuclear power plant comprising three thermodynamic circuits (loops), the pattern of an equilateral triangle may be assigned to the placement of the horizontal shafts in which the gas turbine assemblies are installed, instead of a star-shaped pattern. The center of this triangle likewise coincides with the vertical central axis of the concrete pressure vessel.

If the plant comprises four loops, the horizontal shafts housing the turbine assemblies may either be placed in a star-shaped or in a quadralateral pattern. The center of the quadralateral likewise coincides with the vertical center axis of the concrete pressure vessel.

The gas turbine assemblies in each loop are designed on a common shaft, since such a design offers decisive advantages over a multiple shaft design. The turbines are coupled to the respective generators by means of intermediate shafts.

The nuclear power plant according to the invention can be operated by a high-temperature reactor with either a helium-driven turbine or with a combination of gas/steam turbine circuit. The suggested locations for circulatory components may also be applied to corresponding circuits in gas-cooled fast-breeder reactors.

In a further embodiment of the nuclear power plant according to the invention, each thermodynamic circuit (loop) comprises one recuperator and one cooler which are each installed in a vertical pod, symmetrically to the horizontal shaft housing the gas turbine assembly. Passages, preferably horizontal, have also been provided in the upper sector of the concrete pressure vessel between the respective pods in which the thermodynamic circuits (loops) are installed. These ducts convey the gas between the various heat exchangers. In order to achieve a maximally efficient design of the vertical pods, the horizontal ducts are bent at an angle.

In yet another embodiment of the power plant according to the invention, each thermodynamic circuit (loop) comprises a plurality of recuperators and coolers whereby one recuperator and one cooler are installed together, one above the other, in a vertical pod. The recuperator is installed above the cooler, by a method referred to as "compound building method". In this type plant, the vertical pods associated with each loop are preferably installed symmetrically to the shaft containing the respective gas turbine assembly.

The gas ducts leading to the recuperators and coolers may be designed so as to enter the vertical pods somewhat below the level at which the heat exchangers have been installed. Or, as an alternate possibility, they may be designed separately in such a way that the gas ducts leading to the recuperators may join into the vertical pod between the recuperator and the cooler, while the gas ducts serving the coolers may discharge from the pods below the heat exchangers.

Preferably a minimum of three radially placed outlet pipes are installed in the base area of the nuclear reactor, and each is connected to a vertical pipe carrying hot gas. These pipes which connect the reactor core with the gas-turbine assemblies are installed respectively in the vertical gas transport pods.

One or several ducts carrying hot gases may be provided to serve each gas-turbine assembly, with each duct being installed in a separate pod. In installations where dual hot-gas ducts are provided, both ducts are located in separate vertical pods which are placed in symmetry to the horizontal shaft pertaining to its respective gas-turbine assembly and are connected with this shaft by a cross-intersecting channel. In designs where each thermodynamic circuit (loop) is served by only a single hot-gas duct, the vertical pod conveying the hot gas is placed vertically directly over the turbine shaft or pod.

To convey the depressurized gas from the turbines to the recuperators in the embodiment which has one recuperator and cooler for each thermodynamic loop, a gas duct is installed in the prestressed concrete. This duct rises at first vertically for a certain distance and then leads horizontally to its respective pod where it enters on the side at a position beneath the recuperator. To carry the cooled gas from the cooler to the compressor in each loop, a similarly angled gas duct is preferably provided which exits vertically from the vertical pod housing the cooler, and then laterally enters the compressor. All the mentioned embodiments have in common that the cold gas moving out of the compressors, which must be returned to the recuperators, is preferably led to the greatest extent possible through the vertical gas transport pods connected to the turbine tunnel. The cold gas is thereby conveyed in part coaxially with the hot-gas ducts, which are insulated on their insides. By this process the ducts containing the hot gas are immersed in a flow of cold gas, so that a secondary heat barrier between the hot gas and the concrete is formed and prevents the latter from becoming unduly overheated.

The gas ducts conveying gas from the recuperators to the reactor core are likewise advantageously constructed in part coaxially and installed inside of the vertical gas transport pods. Thus, the gas which moves back to the reactor and which has already absorbed heat again from the recuperators moves through the interior pipes, which are immersed in the stream of cold gas moving in the outer mantle or shell from the compressors to the recuperators.

It is of advantage that the pods which are provided for the installation of components comprising the circuits inside the concrete pressure vessel, as well as the reactor cavern itself, be equipped with gas-tight steel liners. Any surges in pressure that may occur are absorbed by the concrete. To prevent overheating of the concrete, the exterior face of the liners is cooled by water. The liners are further protected by an additional heat-insulating mantle.

On the inside of the concrete pressure vessel there is preferably installed a secondary system for the dissipation of excess heat, comprising in the conventional manner a blower, either with or without a recuperator, and a cooling device. This secondary cooling system is installed in at least three vertical pods located symmetrically in a circular pattern surrounding the reactor chamber. This cooling system is intended to cover emergencies and operates independently from the primary circulatory system. In the gas turbine installations under discussion (which are designed with a single drive shaft), the secondary cooling system guarantees the removal of the reactor heat in the event of a breakdown of the gas turbines, as well as during periods of shut-down and in cases of failure of the equipment.

It is preferred that all components conveying active gas be integrated in one safety vessel ("Containment") which is fully accessible during the operation of the plant and which contains all the openings necessary for the installation and removal of components requiring maintenance and repair. The pre-stressed concrete pressure vessel is installed at the center of the safety vessel and on top of this safety vessel there is placed a revolving crane used for moving major components in and out of the vessel.

Further objects, features and advantages of the invention will become apparent from the following detailed description of three preferred embodiments of the invention, when considered with the attached figures of drawing.

DETAILED DESCRIPTION OF PREFFERRD EMBODIMENTS

Figure 1:
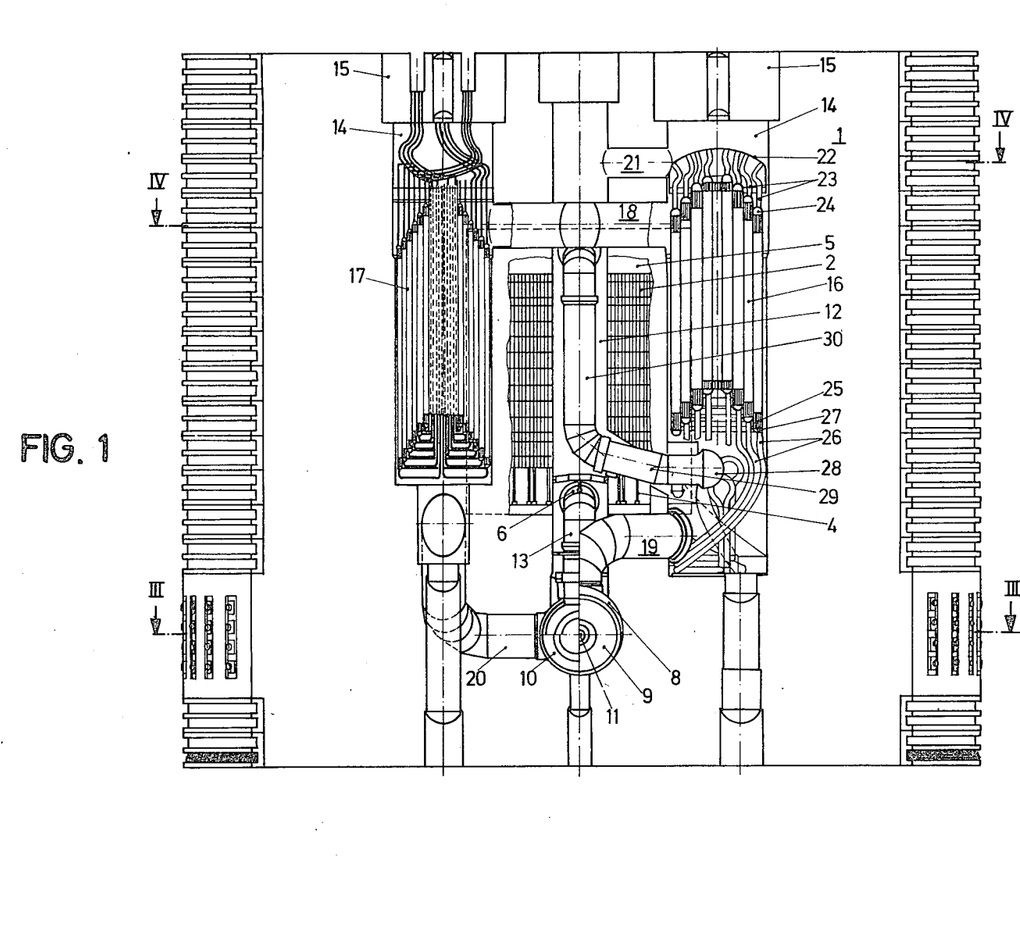
FIG. 1 is a fragmentary vertical sectional view of one embodiment a nuclear power plant according to the invention, taken substantially along the line 1—I in FIG. 4.
Figure 2:
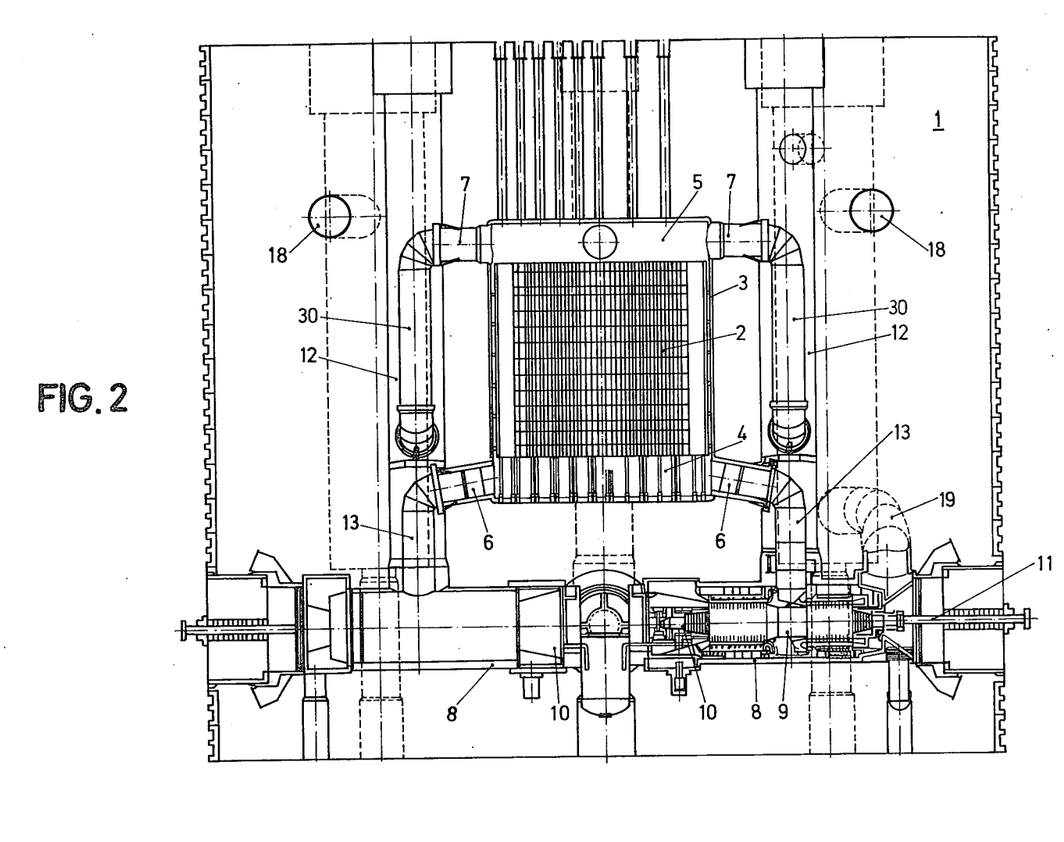
FIg. 2 is a vertical sectional view taken along the line II—II in FIG. 4.

FIGS. 1 and 2 show a pressure-tight tank 1 of cylindrical shape made of reinforced concrete installed centrally inside a cylindrical safety tank (not shown) likewise made of reinforced concrete. Pressure tank 1 encloses a nuclear reactor 2 together with the primary circuit which is comprised of three thermodynamic circuits (loops) coupled to the nuclear reactor 2. Each loop comprises a turbine, a compressor a recuperator and a cooler, as will be described in further detail below. Also installed inside the safety tank 1 are all active gas-carrying auxiliary components as well as the devices required for completion of the primary circuit components.

The nuclear reactor 2, which is installed in cavity 3, is a graphite-modified, helium-cooled high temperature reactor the fuel elements of which are either ball- or block-shaped. Underneath the floor of the reactor core is a hot gas collection chamber 4 which receives the hot gas released by the reactor core. Above reactor core 2 is a cold gas collection chamber 5 which accummulates the cold gas returning from the main circuit before it reenters the core. Reactor 2 is connected to the three loops of the primary circuity by three radially placed outlet pipes 6 and an equal number of inlet pipes 7.

Figure 3:
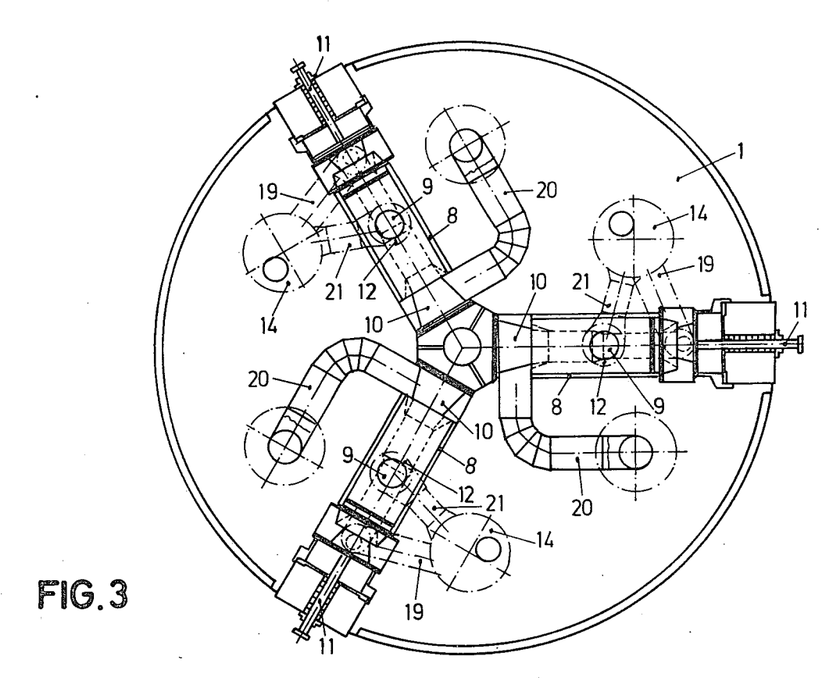
FIG. 3 is a horizontal sectional view taken along the line III—III in FIG. 1.

Perpendicularly under the high-temperature reactor 2 and at a distance adequate to assure positive shielding, three horizontal shafts 8 are built inside the concrete housing 1. These pods are built in a star-shaped or radial pattern and converge at the vertical central axis of vessel 1. Inside each shaft a single-phase gas turbine 9 is installed on a common shaft with compressor 10. Each turbine 9 is coupled to a generator (not shown), mounted inside the safety tank. The star-shaped pattern in which the horizontal pods 8 are built is shown in detail in FIG. 3.

Above each turbine extends a vertical gas transport pod 12 which is directely connected with turbine shaft or pod 8. The three gas transport pods 12 are installed symmetrically in a partial circle around the central axis of the concrete pressure vessel 1. In these pods, three hot-gas pipes 13 are installed, each of which connects one of the reactor's outlet pipes 6 with one of the gas turbines 9.

Six vertical pods 14 are installed symmetrically in a circular pattern around the reactor cavity 3. These pods are sealed off by explosion-proof lids 15, which are secured with an excess number of fasteners. Vertical pods 14 serve as housings for the heat exchanger assemblies, whereby each of the three loops is connected to two such pods 14, one of which houses a recuperator 16 and the other a cooler 17. Both these pods are placed symmetrically to turbine tunnel 8. The rcuperators 16 and the coolers 17 are installed at the same vertical level as the reactor cavity 3. The three recuperators 16 are designed to operate counter-currently, with the high-pressure gas passing through the inner ducts. The three coolers 17 likewise function on the counter-current principle, with the water passing through the interior pipes.

Figure 4:
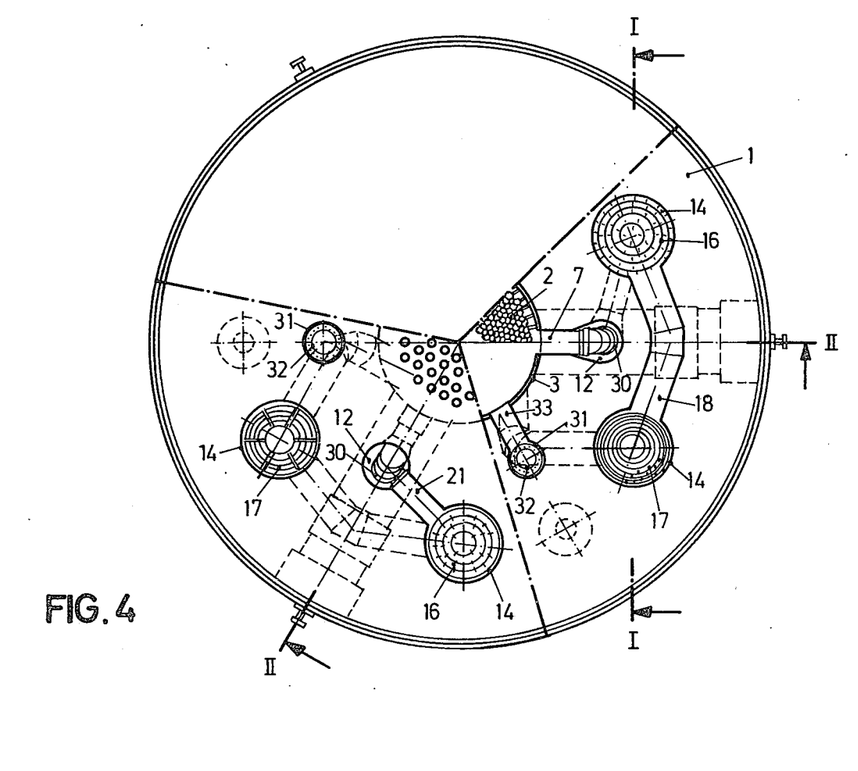
FIG. 4 is a horizontal sectional view taken along the line IV—IV in FIG. 1.

In the upper section of the reinforced concrete pressure vessel 1, three horizontal pods 18 are provided, each uniting the two vertical pods 14 which belong to one loop. Pods 18 serve to convey the gas from the recuperator to the cooler pertaining to each loop. For reasons of an improvement in the design, the horizontal pods 18 are angularly bent, as shown in FIG. 4.

An additional gas duct 19 connects each turbine 9 with the recuperator 16 of the same loop. Duct 19 rises vertically and then enters the corresponding vertical pod 14 laterally from below. The connection of cooler 17 with compressor 10 in each loop is achieved through gas conduit 20 which exists near the bottom of the associated vertical pod 14 and then is angled perpendicularly at the level of the condenser, which it enters laterally.

The major portion of the cold gas emitted by the compressors 10 is brought to the recuperators 16 in the three loops by vertical pods 12, which are located above turbine 9. The gas is moved first along the exterior of hot-gas ducts 13, which are formed as coaxial ducts. At the upper extremity of each gas transport pod 12, a horizontal connecting pipe 21 is installed connecting it with vertical pod 14 in which the recuperators 16 are installed. Distributor manifolds 22 are installed above the recuperators 16 and have connected thereto a plurality of smaller pipes 23. These pipes are in turn connected to recuperator collectors 24, which distribute the gas to tubes 25. Below each recuperator 16, a multiplicity of smaller diameter tubes 26 have been installed which connect the recuperator collector 27 with collector manifold 28. Gas pipe 29 rises at a slanting angle and then enters into vertical pod 12 of the respective loop and continues on as coaxial pipe 30, which is surrounded by the cold gas which moves from compressor 10 to recuperator 16. Pipe 30 which extends upwardly inside gas transport pod 12 is curved at its upper extremity, so as to become connected to one of the three radially installed intake connectors 7 of the reactor. Thereby the system circuit is closed.

The coaxial gas ducts, as well as all cavities inside of the stressed-concrete tank 1 are lined with gas-tight steel liners which are heat insulated and cooled by water. In the areas surrounding the vertical pods 12 housing the coaxial gas ducts, there occur only moderate temperature loads on the liners, since each stream of hot gases is surrounded by a counterflow of cold gas.

As seen in FIG. 4, in addition to the six vertical pods 14 housing heat-exchanging components inside of concrete tank 1, three additional vertical pods 31 have been installed, having a smaller diameter than pods 14 and being located on an arc of smaller diameter. Pods 31 are arranged so as to occupy the spaces between gas transport pods 12. Pods 31 extend approximately up to the top edge of the reactor, and serve as receptacles for a secondary cooling system 32, which comprises a blower, a recuperator, and a cooler, in conventional manner.

Since it is not a part of the present invention, the component parts of this secondary cooling system are not shown in detail. Through a hot-gas duct (not shown), heated gas from the reactor is introduced into system 32 where it is cooled and condensed before being returned, as cold gas, through duct 33 to the nuclear reactor 2.

In the following paragraph the main, or turbine, circuit is once more summarized briefly. The description pertains to each of three identical thermodynamic circuits (loops) connected in parallel.

The working process takes place within the range between a maximal pressure of 63.0 bar and a minimum pressure of 23.5 bar. The temperature ranges between an upper limit of 850° C. and a lower limit of 28° C. The gas, heated to 850° C. under 60.0 bar pressure, flows directly from the hot-gas accumulator 4, by way of hot gas tubes 13, to gas turbine 9.

In turbine 9 the working gas is expanded to 23.5 bar and its temperature reduced to about 529° C. Through gas pipe 19, the gas moves upwardly into recuperator 16 through which it passes upwardly on the shell side. During its passage, it is cooled down to about 253° C. by the cold gas moving along the high-pressure side of the recuperator 16. The gas flows through the horizontal shaft 18 to cooler 17, again on the shell side, but moving in a downward direction. In passing, the gas is cooled to the lowest point of the process temperature range, namely 28° C., before entering compressor 10 through gas pipe 20.

In compressor 10 the working gas is raised to the maximum process pressure of 63.0 bar and its temperature is increased to about 202° C. It is moved through vertical gas transport pod 12 and through horizontal connecting tube 21 into distributor head 22 of recuperator 16. There the gas is first distributed over smaller tubes 23 and subsequently brought to recuperator-box accumulator 24 where it is distributed over tubes 25. In its downward passage through tubes 25, the gas is heated to 485° C. by the turbine-exhaust gas flowing along the shell side in opposite direction.

From the lower recuperator-box accumulators 27 the heated gas passes through smaller tubes 26 to accumulator head 28 where it enters the slanted duct 29 and is then led through coaxial tubes 30 installed in the upper section of gas duct pod 12. From there it moves directly through the reactor intake valve connected thereto and into the cold-gas accumulator 5 of the nuclear reactor.

Figure 5:
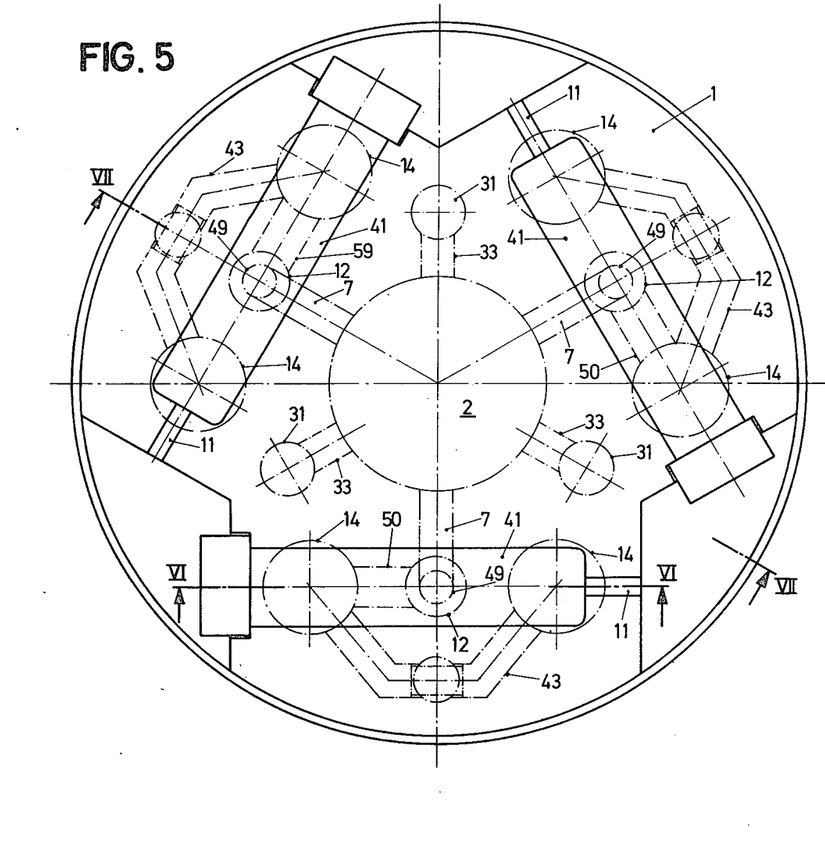
FIG. 5 is a top-view of a second embodiment of the invention.
Figure 5A:
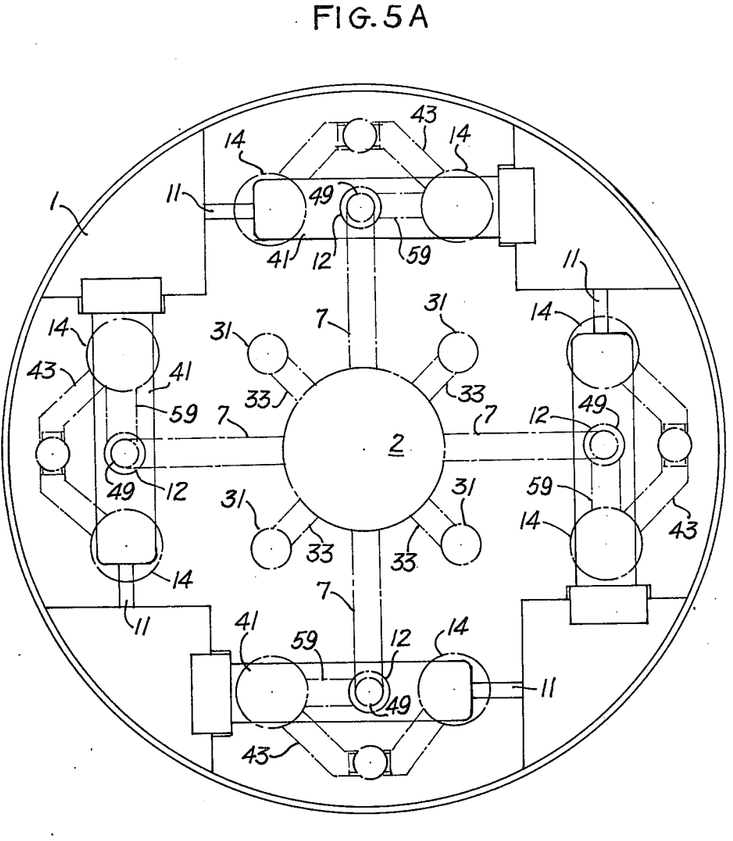
FIG. 5a is a view, similar to FIG. 5, of a further embodiment of the invention.
Figure 6:
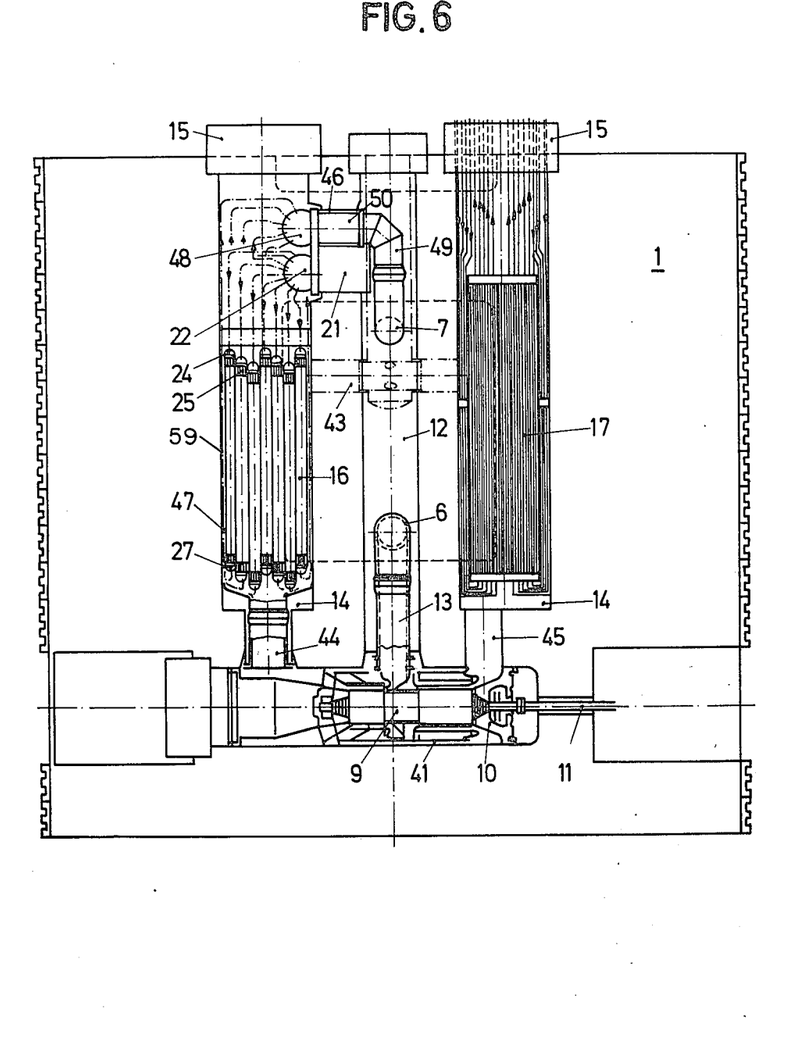
FIG. 6 is a vertical sectional view along the line VI—VI in FIG. 5 of the embodiment shown in FIG. 5.
Figure 7:
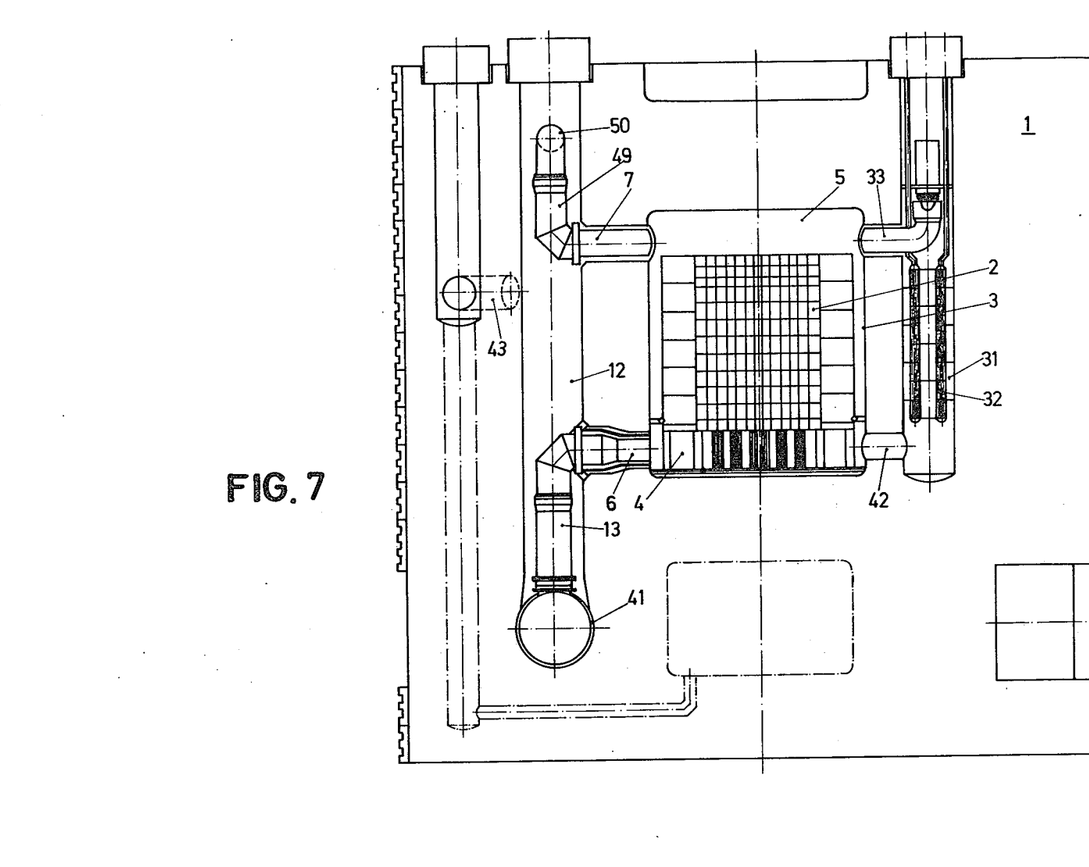
FIG. 7 is a vertical sectional view along the line VII—VII in FIG. 5.

FIGS. 5, 6 and 7 show a second embodiment of the nuclear power plant according to the invention. To the extent that identical components are concerned, the same reference numerals apply as in FIGS. 1 to 4.

Also in this embodiment of the nuclear power plant, the primary circuit comprises three parallel-connected thermodynamic circuits (loops) which are installed in a pre-stressed concrete vessel 1 and coupled with nuclear reactor 2. Each loop comprises a turbine 9, a compressor 10, a recuperator 16, and a cooler 17. Turbine 9 and compressor 10 are installed on a common shaft 11. The fundamental difference between this embodiment and the preceeding one is that the three turbines 9 are installed in horizontal hollow pods 41, which are not in a star-shaped pattern, but rather are in the pattern of an equilateral triangle, the center point of which coincides with the central vertical axis of the concrete pressure vessel 1. This is clearly shown in FIG. 5.

The high-temperature nuclear reactor 2 is installed in a cavity 3. Above the reactor core is provided an accumulator chamber 5 where cold gas is collected, and underneath reactor 2 is a hot-gas collecting space 4. The reactor 2 is connected with three turbines 9 through three radially installed outlet pipes 6 and three hot-gas ducts 13. The working gas is brought to the reactor core by three radially installed inlet pipes 7.

The hot-gas ducts 13 are installed coaxially in vertical gas pods 12, each extending upwardly above a turbine 9. The three gas transport pods 12 are distributed symmetrically in a divided circle having the vertical central axis of the vessel as its center.

In a divided circle of somewhat larger radius, six vertical pods 14 are provided, which are closed off by explosion-proof lids 15. Each loop comprises a pair of vertical pods 14, one of which contains the recuperator 16 and the other of which contains cooler 17. Vertical pods 14 are installed symmetrically with respect to the gas transport pod 12 of the same respective loop. The pods 12 are installed above the turbine tunnel 41 in such manner that the recuperators and coolers are at the same level as reactor core 3.

In a circle having a smaller diameter than that of the three gas transport pods 12, three additional vertical pods 31 are provided, having a smaller diameter. In each of these pods 31, a secondary cooling system is installed. Pods 31 are placed symmetrically in the spaces between vertical pods 12. By means of two ducts 33 and 42, the secondary cooling system 32 is connected to the reactor, as shown in FIG. 7.

The paired vertical pods 14 in each loop are interconnected by means of an angular horizontal shaft 43, which runs on approximately the same vertical level as the recuperator box accumulator 24 of recuperator 16 belonging to the loop under consideration. The working gas is carried by tunnel 43 fron recuperator 16 to cooler 17. In each loop a short, vertical gas duct 44 connects each turbine 9 with its respective recuperator 16, and duct 44 enters its respective pod 14 directly from below. Vertical gas duct 45 carries the gas from cooler 17 to compressor 10 in each loop, entering the compressor directly from above.

Most of the cold gas is brought from the compressors 10 to the recuperators 16 through vertical pods 12 which are installed above turbine 9. The gas first flows in the exterior tube of coaxial hot-gas pipe 13 to the horizontally installed connecting pipe 21, and from there it passes into recuperator 16 installed in pod 14. The connecting pipes 21 are installed in the large horizontal openings 46 which are of sufficiently large diameter to accommodate another gas pipe.

Through distributor heads 22 which are installed above recuperators 16, the cold gas is conveyed to recuperator-box accumulator 24 where it is distributed over coaxial pipes 25, in which it flows downwardly. Below the recuperators, a number of recuperator box accumulators 27 subsequently combine the gas streaming out of the various pipes. The gas flow is subsequently reversed by 180°, and it then passes through an annular-shaped aperture 47 into the vertical pods 14, and ultimately into collector heads 48. The heads 48 are each connected to a gas duct 50 installed above connecting pipes 21 in one of the horizontal openings 46. Gas duct 50 is connected with gas transport pod 12. Downwardly extending coaxial ducts 49 connect with ducts 50, and ducts 49 are surrounded by cold gas coming from the condenser 10. Through connection of ducts 49 with the three intake valves 7 of the reactor, the gas circuit is again closed.

In the following paragraph the path of the working gas through the component parts of the circuit is again briefly summarized, the description being limited to one of the three thermodynamic circuits (loops).

From the hot-gas accumulating chamber 4 the heated working gas is moved through the reactor outlet pipe 6 and through hot-gas duct 13 to turbine 9 where it performs its work, thereby decreasing in pressure. It passes through the short vertical gas tube 44 and enters the recuperator 16 from below, where it streams around coaxial tubes 25, thereby transferring its heat to the cold gas moving in the opposite direction, through tubes 25. The gas then passes through horizontal shaft 43 into cooler 17, passing through it in downward direction on the shell side, thereby being further cooled. The gas then enters compressor 10 through vertical gas duct 45. In compressor 10 the gas reaches its maximal pressure applied in the process. The gas then moves into vertical gas duct 12 where it first flows around coaxial hot-gas pipe 13, and subsequently around the likewise coaxial pipe 49. Through horizontal connecting duct 21 the cold gas is moved to distributor head 22 of recuperator 16 and subsequently distributed over the individual recuperator-box accumulator 24, to which are connected tubes 25. In passing through tubes 25 in a downward direction, the gas is heated by the turbine gas countercurrently flowing on the shell side. The gas passes through lower recuperator-box accumulator 27 out of recuperator 16. It is turned around by 180° and then passes from below through the annular-shaped aperture 47 into collector head 48. It subsequently passes through gas duct 50 into coaxial pipe 49 inside gas pod 12, through which it passes to the inlet pipe of the reactor. From there it enters again into the cold-gas accumulator 5 of reactor 2.

Figure 8:
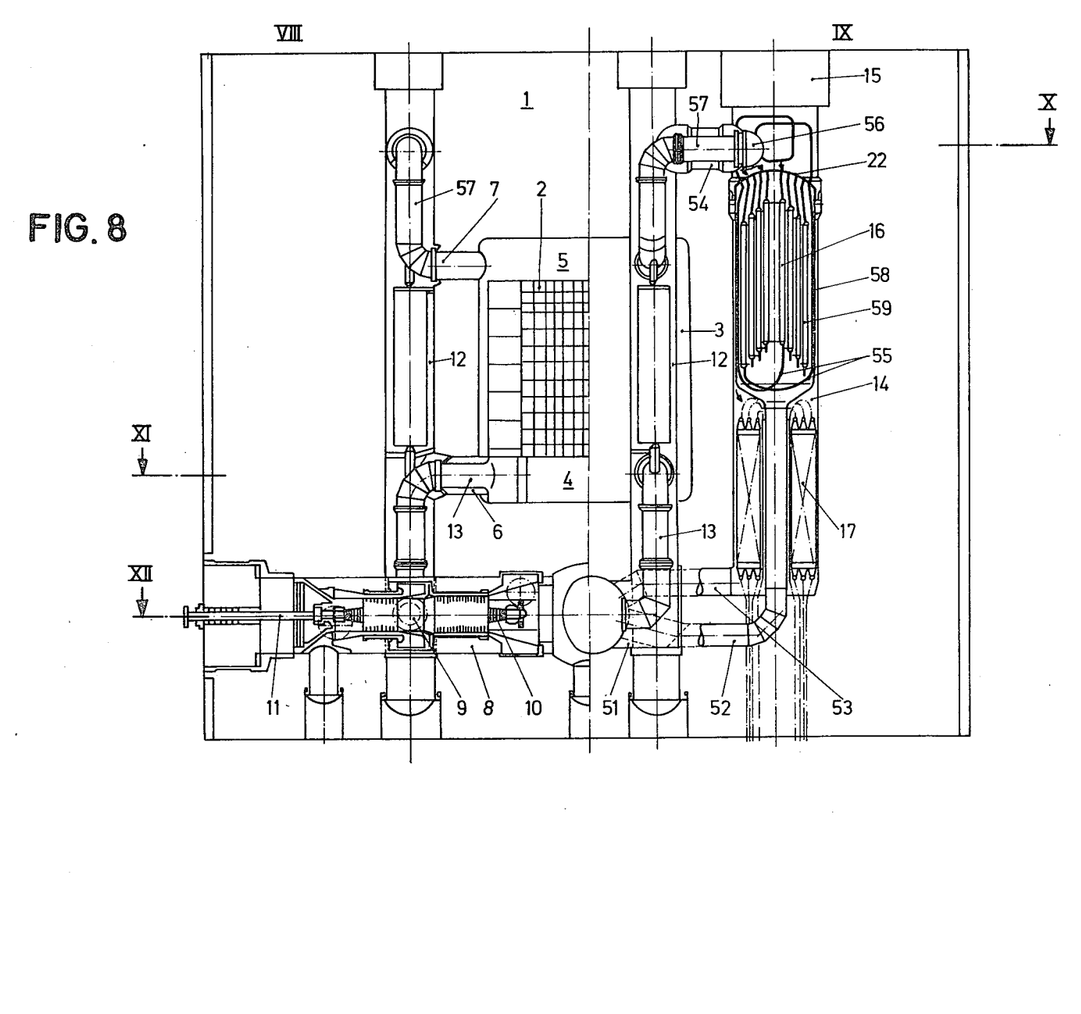
FIG. 8 is a vertical sectional view of a third embodiment of the invention shown in two sectional half views: the left side is taken along the line VIII—VIII and the right side along the line IX—IX, both in FIG. 9.
Figure 9:
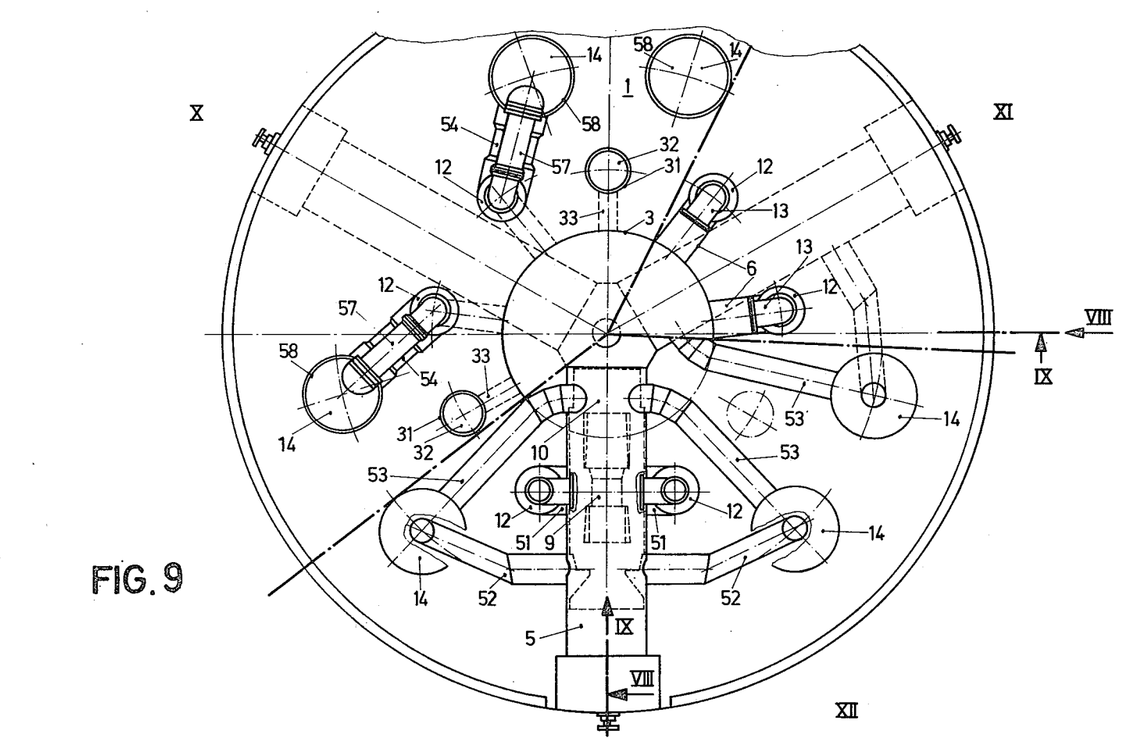
FIG. 9 is a horizontal sectional view of FIG. 8 along the planes X, XI and XII.

FIGS. 8 and 9 show a third embodiment of the power plant according to the invention. Its primary circuit likewise comprises three parallel connected loops which are installed in a pressure vessel made of prestressed concrete and are coupled with a nuclear reactor 2. In the description of this embodiment, identical reference numerals are again used for identical component parts as in FIGS. 1 to 7.

In contrast to both of the embodiments described above, the present embodiment is equipped with two hot-gas pipes 13 for each thermodynamic circuit (loop), which are each positioned in a vertical gas transport pod 12, and with two recuperators 16 and two coolers 17. By the principle of compound construction, one recuperator and one cooler each are installed in one vertical pod 14, with the recuperator installed in the upper position in the pod.

The three turbine assemblies comprised of the gas turbine 9 and the compressor 10 are installed, as in the first embodiment, in three horizontal shafts 8 which are set in a star-shaped pattern, and converge at the vertical central axis of pressure vessel 1 which is made of pre-stressed reinforced concrete.

The high-temperature reactor 2, which is cooled by helium and moderated by graphite, is built into a cavity 3 and comprises above the reactor core a cold-gas accumulator space 5 and under the reactor core a hot gas accumulator space 4, to which are connected six radially placed outlet pipes 6. The helium is brought into the reactor core through radially installed inlet pipes 7.

The three gas-turbine assemblies 9, 10, are connected to reactor outlet pipes 6 by six coaxial hot-gas pipes 13. Two hot-gas pipes 13 are connected to each turbine 9. Vertical gas transport pods 12, in which hot-gas pipes 13 are installed, are placed in a circular pattern symmetrically around the central axis of the reinforced concrete pressure vessel 1, and the two pods 12 belonging to one loop are installed symmetrically to he appropriate turbine tunnel 8. The pods 12 are connected with tunnel 8 by a horizontal cross-connecting channel 51.

In a circular pattern of somewhat larger diameter surrounding reactor cavity 3, six vertical pods 14 are installed, each sealed off by an explosion-proof lid 15. Each thermodynamic circuit (loop) comprises two pods 14, which are installed symmetrically to turbine pod 8 in each respective loop. In each vertical pod 14 one recuperator 16 and one cooler 17 are installed one above the other, whereby each gas-turbine assembly comprises two recuperators and two coolers.

Each turbine 19 is connected with the respective pair of recuperators 16 in its loop by two gas pipes 52, which first traverse the vessel 1 horizontally and subsequently run coaxially in the respective pod 14. The upper extensions of gas pipes 52 pass through the center of cooler 17. Connection between the two coolers 17 and the compressor 10 in each loop is established through two additional gas ducts 53, which exit on the end of vertical pod 14 above the horizontal section of gas pipe 52 and then traverse vessel 1 horizontally.

The gas is moved from the compressors 10 to the recuperators 16 in the three loops to a large extent through vertical pods 12 in the same manner as in the first two embodiments described. Thus, the cold gas moves first through the outer passage of the coaxial tube 13. At the upper extremity of gas transport pod 12 a horizontal connecting pipe 54 is installed which connects it with one of the vertical pods 14. The gas passes through pod 14 and enters the distributor head 22 from where it moves to recuperator 16. The cold gas moves downwardly through tubes 25 bundled as boxes 59. By means of small-bore tubes 55 installed at the periphery of the recuperator, the gas flow is turned around so as to flow again into the upper section. The re-heated gas is moved into gas ducts 57 through collector heads 56 which are installed in the top section of vertical pod 14. Gas ducts 57 are initially arranged as coaxial tubes installed in horizontal ducts 54, and then they extend—likewise coaxially—into gas transport pods 12. These six gas ducts 57 connect the outlets of the recuperators 16 with six inlet pipes 7 of the reactor.

Also in this third embodiment, a secondary cooling system 32 has been installed inside of pressure vessel 1. It is installed in three vertical pods 31, each placed on the respective space between vertical pods 12 of adjacent loops, and is connected to the reactor 2 by two tubes 33 and 42.

The primary, or turbine circuit is essentially the same as described in connection with FIGS. 1 to 7. Variations result only as regards the method by which the gas is transported to and into pod 14 and are due to the compound construction used herewith. The nuclear power plant described here provides for a capacity of 3 × 350 MWe; however, extrapolation (scale-up) to higher capacities, such as 3 × 670 MWe, is possible without great difficulties.

The progress of the working gas through the components of the circuits is once again briefly explained by the following example.

The gas is heated in nuclear reactor 2 and collected in hot-gas accumulator 4. It is distributed through hot-gas pipes 13, through which it moves to the turbine. After being expanded in the working cycle, the gas is led through ducts 52 to the two recuperators 16, during the course of which it flows through the center of pods 14 in their lower regions, which are occupied by the coolers 17. The gas enters the recuperators 16 from below and is led upwardly in counterflow with cold gas moving through tubes 25. After being turned around 180°, the gas flows through an annular aperture 58 around recuperator 16 to cooler 17, through which it likewise moves on the shell side, thereby being cooled further. The gas exits from the bottom of cooler 17 and moves through two ducts 53 to the compressor 10 where it is compressed. The gas then moves through gas transport pods 12 and connecting pipes 54 to recuperators 16 which it enters from the top, flowing at first around the coaxial hot-gas pipes 13 and then passing around the likewise coaxial gas pipes 57. The gas is subsequently distributed by distributor heads 22 of the recuperators 16 over boxes 59 through which it passes in a downward direction through the individual tubes. During this process, the gas absorbs heat from the counterstream of hot exhaust gas moving out of the turbine on the shell side. The gas is then moved through the smaller tubes 55 to the upper extremity of recuperator 16 and collected in collector heads 56. It finally passes through gas ducts 57 to the two inlet pipes 7 of the reactor and from here to cold-gas accumulator tank 5.

What is claimed is:

1. In a nuclear power plant including a thickwalled pressure vessel, a nuclear reactor housed within said vessel, a plurality of separate parallel-connected, symmetrically arranged cooling circuits each comprising as components a turbine assembly, each assembly including a turbine and compressor, recuperative heat exchange means and cooling heat exchange means, each component being housed in a cavity in the vessel wall, and means defining passageways interconnecting the reactor with said turbine, the outlet of said turbine with said recuperative heat exchange means and said cooling heat exchange means with said compressor to form a closed gas coolant circuit for the reactor, the improvement which comprises:
   a. a first set of said cavities for housing each one of said turbine assemblies, each of said first cavities being a horizontally oriented shaft located on the same level as each of the other first cavities in the lower region of said vessel, the cavities of said first set being disposed symmetrically about the vertical central axis of said vessel;
   b. a second set of said cavities for housing said heat exchange means, said second cavities being in the form of vertically oriented pods arranged symmetrically about said reactor on approximately the same level therewith;
   c. interconnected with each of said first cavities at least one first passageway means separate from said second cavities and extending vertically upwardly to a height above said reactor for transporting a cool gas from said compressor to said recuperative heat exchange means, said first passageways being arranged symmetrically about the vertical central axis of said vessel;
   d. said means interconnecting said reactor with said turbine comprising at least one means comprising a conduit for transporting hot gas from said reactor to each of said turbine assemblies, said hot gas conduit means extending vertically over at least part of its length within said first passageway in coaxial relationship with said first passageway; and
   e. at least one means comprising a conduit for transporting reheated gas from said recuperative heat exchange means in each circuit to said reactor, said reheated gas conduit means extending vertically over at least part of its length within said first passageway in coaxial relationship therewith and being axially spaced from said hot gas conduit means in the same first passageway.

2. The nuclear power plant as defined by claim 1, comprising three of said first cavities arranged in radially extending relationship.

3. The nuclear power plant as defined by claim 2, wherein said radially extending first cavities extend inwardly to said central axis of said vessel.

4. The nuclear power plant as defined by claim 1, comprising three of said first cavities arranged along the sides of an equilateral triangle.

5. The nuclear power plant as defined by claim 1, comprising four of said first cavities arranged along the sides of a quadrangle.

6. The nuclear power plant as defined by claim 1, wherein the turbine and compressor of each of said turbine assemblies are connected to a single shaft.

7. The nuclear power plant as defined by claim 1, wherein said heat exchange means of each of said circuits comprises a recuperator and a cooler, each being positioned in a separate one of a pair of said second cavities associated with each turbine assembly, said pair of second cavities being arranged symmetrically with respect to the first cavity which houses said associated turbine assembly and wherein said power plant further comprises second passageways interconnecting the upper sections of each pair of second cavities associated with a turbine assembly.

8. The nuclear power plant as defined by claim 7, wherein said second passageways are non-linear.

9. The nuclear power plant as defined by claim 1, wherein said heat exchange means of each of said circuits comprises a plurality of recuperators and a plurality of coolers associated with its turbine assembly, one recuperator and one cooler being contained one above the other in one of said second cavities, and wherein the plurality of said second cavities required to house said heat exchange means are arranged symmetrically with respect to the first cavity which houses said associated turbine assembly.

10. The nuclear power plant as defined by claim 9, further comprising inlet and outlet gas passageways interconnecting with each of said second cavities beneath said heat exchange means contained therein.

11. The nuclear power plant as defined by claim 9, further comprising an inlet gas passageway interconnecting with each of said second cavities between the recuperator and cooler contained therein and an outlet gas passageway interconnecting with each of said second cavities beneath said heat exchange means contained therein.

12. The nuclear power plant as defined by claim 1, including three of said heat utilization circuits and comprising at least three radially oriented outlet pipes on the lower portion of said nuclear reactor and a hot gas conduit connected to each of said outlet pipes, each of said hot gas conduits being contained in one of said first passageways.

13. The nuclear power plant as defined by claim 12, comprising two of said first passageways interconnected by means of a cross-connecting means with each of said first cavities, said two first passageways being arranged symmetrically with respect to each said interconnected first cavity and each containing one of said hot gas conduits.

14. The nuclear power plant as defined by claim 1, comprising a depressurized gas conduit extending vertically upward from each of said turbines and then extending horizontally to interconnect with said heat exchange means.

15. The nuclear power plant as defined by claim 1, comprising a cooled gas conduit extending vertically downward from each heat exchange means and then extending non-vertically to interconnect laterally with said compressor.

16. The nuclear power plant as defined by claim 1, comprising means for introducing cooled, compressed gas from each of said compressors into said first passageway interconnected with said first cavity housing said compressor, and means located near the top of said first passageways for transporting said gas to said heat exchange means, whereby said cooled compressed gas flows at least partially coaxially with respect to said conduits (d) and (e).

17. The nuclear power plant as defined by claim 1, further comprising gas-tight steel liners surrounding said cavities in the pressure vessel and means for cooling said liners externally with water.

18. The nuclear power plant as defined by claim 1, further comprising an auxilliary heat removal system within said pressure vessel, said system comprising a blower and a heat exchange means.

19. The nuclear power plant as defined by claim 18, further comprising at least three vertically oriented auxilliary pods symmetrically arranged about the central vertical axis of said vessel and one of said auxilliary heat removal systems positioned in each of said auxilliary pods.

20. The nuclear power plant as defined by claim 1, further comprising a safety vessel surrounding all active gas carrying parts of said power plant.

21. The nuclear power plant as defined by claim 1, wherein said first cavities are arranged in radially extending relationship.

22. The nuclear power plant as defined by claim 1, wherein said first cavities are arranged in non-parallel relationship.

23. The nuclear power plant as defined by claim 9, wherein said one cooler is positioned below said one recuperator in each of said second cavities.

* * * * *